United States Patent

Boucher

Patent Number: 5,146,708
Date of Patent: Sep. 15, 1992

[54] ANIMAL TRAP TRIGGER

[76] Inventor: Emmanuel Boucher, 1 Rang 4 St Eugene, Lislet, Quebec, Canada, G0R 1X0

[21] Appl. No.: 338,608

[22] Filed: Apr. 14, 1989

[51] Int. Cl.$^5$ .......................................... A01M 23/28
[52] U.S. Cl. .................................................. 43/94
[58] Field of Search ........................... 43/88, 92, 93, 94

[56] References Cited

U.S. PATENT DOCUMENTS

| | | | |
|---|---|---|---|
| 442,845 | 12/1890 | White et al. | 43/94 |
| 531,571 | 12/1894 | Scherb | 43/94 |
| 580,788 | 4/1897 | Killefer | 43/94 |
| 735,957 | 8/1903 | Eberhard | 43/94 |
| 1,553,085 | 9/1925 | Kiler | 43/94 |
| 4,070,787 | 1/1978 | Oakes | 43/94 |

FOREIGN PATENT DOCUMENTS 0109911  4/1900  Fed. Rep. of Germany .......... 43/94

Primary Examiner—Richard K. Seidel
Assistant Examiner—James Miner

[57] ABSTRACT

In a trap used to capture small fur animals by the body or the head, a trigger is necessary to keep the jaws open. In my invention, the trigger is made of one piece of metal. The above mentioned trap will be activated when an animal steps on the piece of metal (invention). This pressure will activate the jaws that are held in an open position due to the pressure of one or more springs.

3 Claims, 1 Drawing Sheet

ANIMAL TRAP TRIGGER

BACKGROUND AND SUMMARY OF THE INVENTION

My invention relates to triggers for that class of animal-traps in which opposing spring controlled jaws are held apart by the trigger and fly together when the trigger is tripped: and my invention consists of the improved animal-trap trigger herein after fully described and claimed. The object of my invention is to provide a simple and highly sensitive trigger for this class of animal-traps. The animals do not have to push or pull on the trigger but simply put their paws on the trigger pan before reaching the bait.

BRIEF DESCRIPTION OF THE DRAWINGS

Refering to the accompanying drawings for a more complete explanation of my invention.

DETAILED DESCRIPTION OF THE DRAWINGS

Figure 1:
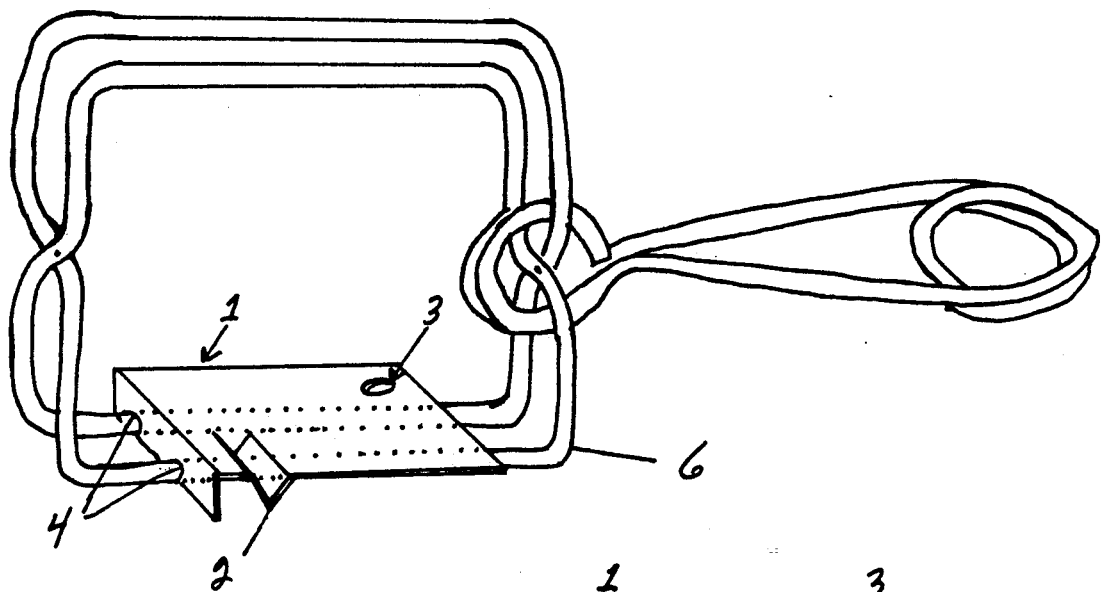
FIG. 1: is a view showing its application to a trap.
Figure 2:
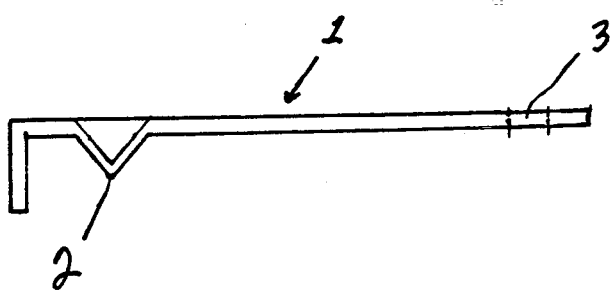
FIG. 2: is a perspective view of my triggers shown in a horizontal cut.
Figure 3:
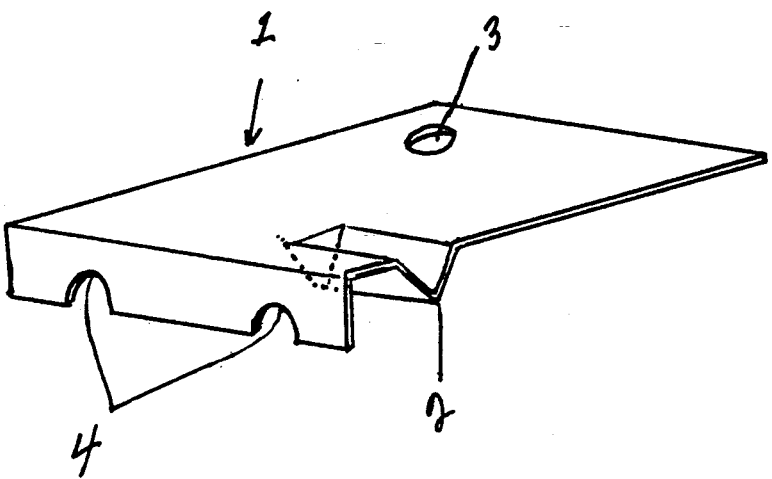
FIG. 3: is a view showing it in a slighty changed position.

The trigger "1" is a plate having at its base one on each end of the folded end a notch "4" which forms an inner and outer shoulder. The animal-trap is formed of pieces of rod having a spring-coil "5" and at one end stems and jaws "6". This is a common form of trap and herein represents any animal-traps of that general class inwhich the jaws are forced togheter by a spring of any character, and are to be held open by a trigger. The trigger "1" which may for convenience be connected with the trap by a ring to be passed in the Hole "3" is placed in a horizontal position so that its shoulders pass down between the jaw-stems on their inner and outer sidesand hold them separated and while the spring force of the stems holds the trigger horizontal in this position the groove "2" rests upon the top of the stems. Now when the trigger is tilted the groove "2" bearing on the stems, act as lever to withdraw the notchs and trip the trap. The term "stems" as herein used is meant to refer to the rod used to form the jaws. When the trigger "A" is placed on the jaws "F" of the crossing point of the stems as in FIG. 1 the outer shoulders serve to hold the jaws open. This trigger can be easily and safely placed holding well andsurely in position and yet is extremely sensitive to the tilling action.

I claim:

1. An animal trap trigger comprising a top plate, an edge plate and a tab means, wherein the tab means and the edge plate are spaced apart and extend from the top plate in a substantially perpendicular fashion, the edge plate further comprising two receptacles to receive the jaws of a trap, the tab being positioned so as to function as a fulcrum to disengage the receptacles from their associated jaw when the top plate is tilted.

2. The animal-trap triggeraccording to claim 1 wherein the two receptacles are half-moon shaped.

3. The animal-trap trigger according to claim 1 wherein the two receptacles are square shaped.

* * * * *